United States Patent
Imai et al.

[11] Patent Number: 6,025,572
[45] Date of Patent: Feb. 15, 2000

[54] LASER PIERCING APPARATUS FOR A WEB MATERIAL

[75] Inventors: Kiyoshi Imai; Junichi Fukuchi; Michiaki Takatsu, all of Tokyo, Japan

[73] Assignee: Japan Tobacco Inc., Tokyo, Japan

[21] Appl. No.: 09/084,003

[22] Filed: May 26, 1998

[30] Foreign Application Priority Data

May 26, 1997 [JP] Japan .................................... 9-135343

[51] Int. Cl.⁷ .................................................. B23K 26/00
[52] U.S. Cl. ........................................ 219/121.7; 131/281
[58] Field of Search ............................ 219/121.7, 121.71; 131/281

[56] References Cited

U.S. PATENT DOCUMENTS

| | | | |
|---|---|---|---|
| 4,297,559 | 10/1981 | Whitman, III | 219/121.7 |
| 5,259,401 | 11/1993 | Lange et al. | 131/281 |
| 5,341,824 | 8/1994 | Fletcher et al. | 131/281 |

FOREIGN PATENT DOCUMENTS

| | | | |
|---|---|---|---|
| 4108166 | 9/1992 | Germany | 131/281 |
| 5-138381 | 6/1993 | Japan . | |

*Primary Examiner*—Geoffrey S. Evans
*Attorney, Agent, or Firm*—Birch, Stewart, Kolasch & Birch, LLP

[57] ABSTRACT

A piercing apparatus includes a laser oscillation head for irradiating a pulsed laser beam onto a tip paper which travels at a prescribed speed along a traveling path to form minute holes at spacial intervals in the tip paper, a camera for picking up a picture image of a minute hole formed in the tip paper, and a controller for feedback-controlling the drive of the laser oscillation head in accordance with the size of and the spacing between minute holes obtained by analyzing one or more picture images of minute holes, so that minute holes of a desired size are formed in the tip paper with a desired spacing, to provide the tip paper with a desired air permeability.

7 Claims, 3 Drawing Sheets

LASER PIERCING APPARATUS FOR A WEB MATERIAL

BACKGROUND OF THE INVENTION

1. Field of the Invention

The present invention relates to a piercing apparatus which is suitable for the formation of minute holes in a web material such as a tip paper used to connect a cigarette with a filter plug.

2. Related Art

Recently, a tip paper of a type formed with minute holes which serve to adjust the air permeability of the tip paper is employed for the production of filter cigarettes. A piercing apparatus for forming such minute holes in a tip paper is known from Japanese Provisional Patent Publication No. 5-138381, for instance. This piercing apparatus is configured to obtain a deflected laser beam, by deflecting, with use of a polygon mirror, a laser beam continuously supplied from a laser source and to irradiate the deflected laser beam via an optical system onto a tip paper which travels at a constant speed, thereby forming minute holes at regular intervals in the tip paper.

In the aforementioned piercing apparatus, the spacial interval at which the minute holes are formed is naturally determined based on a relationship between the traveling speed of the tip paper and the rotational speed of the polygon mirror. Hence, it is difficult to immediately adapt the piercing apparatus to a changeover of kinds of tip papers which necessarily follows the changing of a kind or brand of filter cigarettes to be manufactured by the cigarette manufacturing machine.

Specifically, a required spacing with which minute holes are to be formed in the tip paper varies in dependence on the brand of filter cigarette. In a case where minute holes are formed in multiple rows, moreover, a required number of rows varies depending on the brand of cigarette. To satisfy the requirements in respect of the number of rows or the spacing of minute holes, the arrangement of the optical system, the tip paper traveling speed, or the polygon mirror rotational speed must be changed in a piercing apparatus of the aforementioned type. In the case of changing the polygon mirror rotational speed, however, there occurs a substantial change in the intensity of the deflected laser beam irradiated onto the tip paper, so that the size of minute holes changes. Similarly, the hole size changes, if the tip paper traveling speed is changed. Since the size of minute holes formed in a tip paper greatly affects the air permeability of the tip paper, difficulties will be encountered in manufacturing filter cigarette having a required air permeability, if the hole size is deviated from a desired one.

Conventionally, therefore, a measurement of the actual air permeability of a tip paper is generally carried out, and on the basis of the measured air permeability, the quality of minute holes formed in the tip paper is evaluated. Further, based on the evaluation result, the output intensity of the deflected laser beam or the tip paper traveling speed, for instance, is adjusted, so as to obtain a tip paper having a desired air permeability.

However, such an air permeability measurement and a subsequent evaluation must be made offline and take a lot of time. This makes it impossible to immediately carry out adjustments to be effected on the side of the piercing apparatus or the cigarette manufacturing machine for correction of the air permeability. After all, it is difficult to stably carry out the formation of minute holes having a required size in a tip paper with a required spacing, while adjusting the size of or the spacing between minute holes, by using the aforementioned piercing apparatus in combination with an air permeability measuring device.

SUMMARY OF THE INVENTION

An object of the present invention is to provide a piercing apparatus for a web material, which is capable of forming minute holes in a web material in a stable manner under a simplified control, and preferably capable of forming minute holes of a desired size with a desired spacing.

According to the present invention, there is provided a piercing apparatus for a web material, which comprises: a traveling unit for causing a web material to travel along a traveling path defined in the piercing apparatus; a laser unit, disposed to face the traveling path, for intermittently irradiating a laser beam onto the web material which travels along the traveling path, to thereby form minute holes in the web material; a detection unit for detecting, in real time, a value of at least one parameter relating to formation of the minute holes; and a control unit for controlling a laser beam irradiating action of the laser unit based on the detected parameter value.

With the piercing apparatus of the present invention, the laser beam irradiating action of the laser unit can be properly controlled in accordance with a value, detected in real time, of a parameter which relates to the formation of the minute holes, whereby minute holes having a desired size can be stably formed with a desired spacing.

Preferably, the detection unit includes an optical detector which is disposed to face the traveling path at a location downstream of the laser unit. The optical detector optically detects at least one of the minute holes formed in the web material which travels at a predetermined speed along the traveling path.

With this preferred embodiment, a control of the laser beam irradiating action of the laser unit can be carried out in a manner properly corresponding to one or more minute holes actually formed in the web material, whereby a variation in size of or spacing between minute holes can be removed or reduced.

Alternatively, the detection unit includes a traveling speed detector for detecting a traveling speed of the web material. The traveling speed detector may be employed singly or in combination with the optical detector.

With this preferred embodiment, a control of the laser beam irradiating action of the laser unit can be carried out in a manner properly corresponding to the traveling speed of the web material, whereby influences of a variation in the traveling speed of the web material on the size of or the spacing between the minute holes can be removed or reduced.

Preferably, the piercing apparatus further includes an information unit for analyzing an image of the at least one minute hole detected by the optical detector and for generating information indicative of a result of analysis. For instance, the information unit generates size information indicative of a size of the at least one minute hole detected by the optical detector. The control unit controls the laser beam irradiating action of the laser unit in accordance with the size information. The laser unit may be configured to be pulse-driven and to output a pulsed laser beam. The control unit adjusts at least one of a pulse width and intensity of the pulsed laser beam.

With this preferred embodiment, the laser beam irradiating action of the laser unit can be subject to a feedback control which is effected in a manner properly corresponding to information on one or more minute holes actually formed in the web material and directly detected by the optical detector, thereby adjusting the size of minute holes to a desired one. The laser unit of a pulse-driven type is simple in construction as compared to a laser unit comprised of a polygon mirror, and hence a control of the laser beam irradiating action of the laser unit can be simplified.

Alternatively, the information unit analyzes at least one image in respect of at least two minute holes detected by the optical detector, and generates spacing information indicative of a spacing with which the at least two minute holes are spaced. The laser unit is configured to be pulse-driven and to generate a pulsed laser beam. Based on the spacing information, the control unit adjusts a time interval at which the laser unit is pulse-driven. The spacing information may be employed singly or in combination with the size information.

With this preferred embodiment, the laser beam irradiating action of the laser unit can be subject to a feedback control which is effected in a manner properly corresponding to the spacing between minute holes actually formed in the web material and directly detected by the optical detector, thereby forming minute holes with a desired spacing. The laser unit of a pulse-driven type has a simplified construction and can be operated under a simplified control procedure.

Preferably, the web material is a tip paper used to connect a cigarette with a filter plug.

With this preferred embodiment, the formation of minute holes in a tip paper are controllable, thereby making it possible to adjust the air permeability of the tip paper to a desired one, whereby the quality of a filter cigarette comprised of such a tip paper can be improved.

DETAILED DESCRIPTION

With reference to the appended drawings, a piercing apparatus for a web material according to an embodiment of the present invention will be explained.

Figure 1:
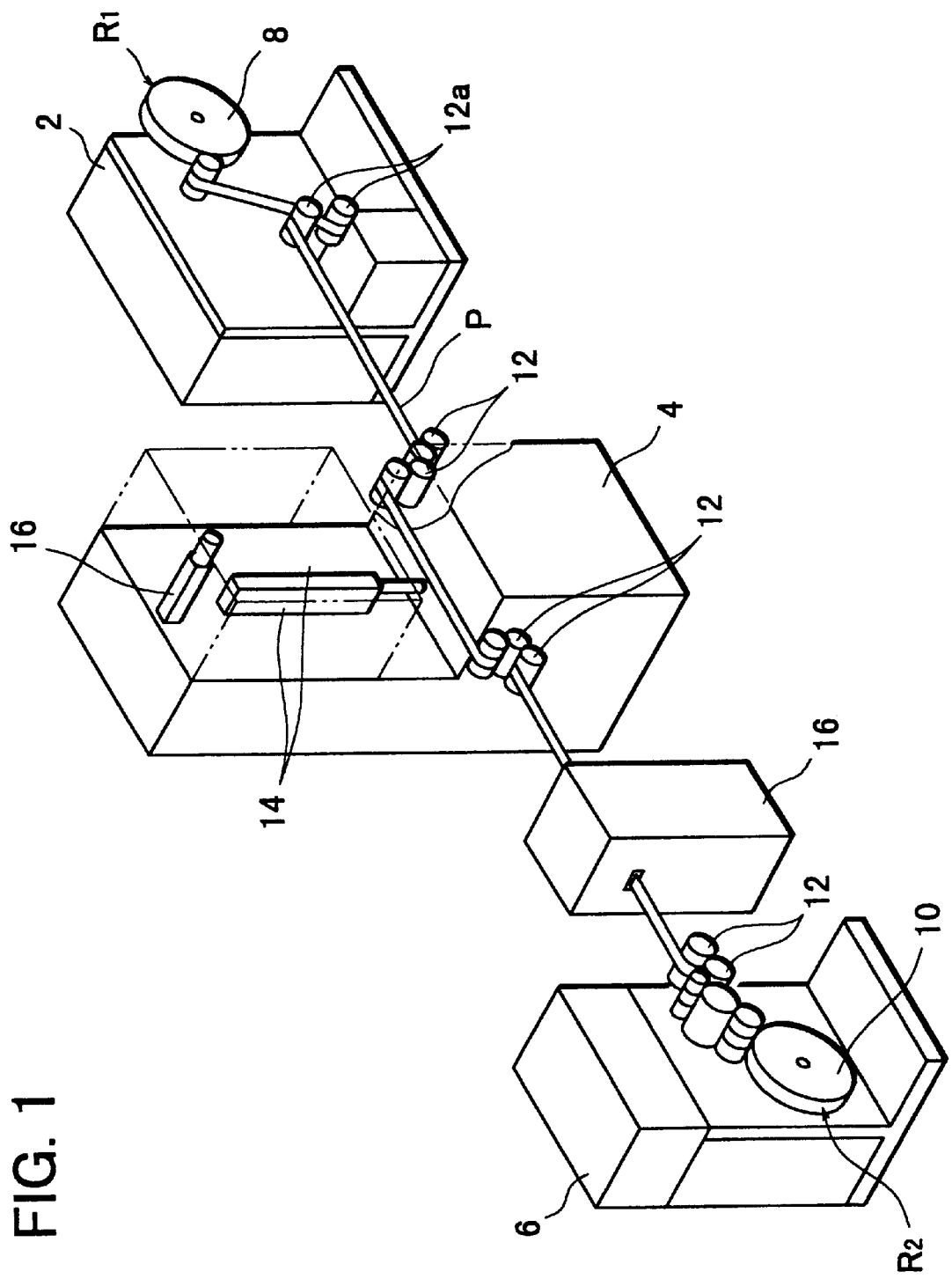
FIG. 1 is a schematic perspective view showing a piercing apparatus according to an embodiment of the present invention.

In FIG. 1, a piercing apparatus of a single bobbin type is shown which is designed to form, with use of a laser beam, minute holes in a tip paper serving as a web material. The piercing apparatus is comprised of a feeding section 2, a piercing section 4, and a winding section 6 which are spaced from one another. The feeding section 2 has a rotary shaft (not shown) thereof mounted with a bobbin 8 to which a feed roll R1 of a tip paper P is attached. The winding section 6 has a rotary shaft (not shown) thereof mounted with a winding bobbin 10 for winding the tip paper P formed with minute holes at the piercing section 4. Symbol R2 denotes a roll of the tip paper P wound by the winding bobbin 10.

Guide rollers 12 and 12a are rotatably mounted to the feeding, piercing and winding sections 2, 4 and 6. The tip paper P fed from the feed roll R1 passes the piercing section 4 to reach the winding bobbin 10, while being guided by the guide rollers 12 and 12a. These guide rollers 12 and 12a serve to define a traveling path along which the tip paper P travels. A pair of guide rollers 12a are spaced vertically from each other in the feeding section 2 and have a function of suppressing and correcting a snaking travel of the tip paper P. The winding section 6 cooperates with the guide rollers 12 and 12a to constitute a traveling unit for causing the tip paper P to travel.

Although not illustrated in detail, the rotary shaft of the winding section 6 is coupled to an electrically-driven motor through a powder clutch. A powder brake is attached to the rotary shaft of the feeding section 2. The winding bobbin 10 is rotatively driven in one direction by the electrically-driven motor. With rotation of the winding bobbin 10, the tip paper P is fed from the feed roll R1 and is formed with minute holes while passing the piercing section 4. Then, the tip paper P is wound by the winding bobbin 10. During this time, the tip paper P travels at a constant speed along the traveling path extending between the feed roll R1 and the winding bobbin 10. A feeding tension applied to the tip paper P fed from the feed roll R1 is maintained at nearly constant by means of the powder brake, and a winding tension applied to the tip paper P wound on the winding bobbin 10 is also maintained at nearly constant by means of the powder clutch.

Figure 2:
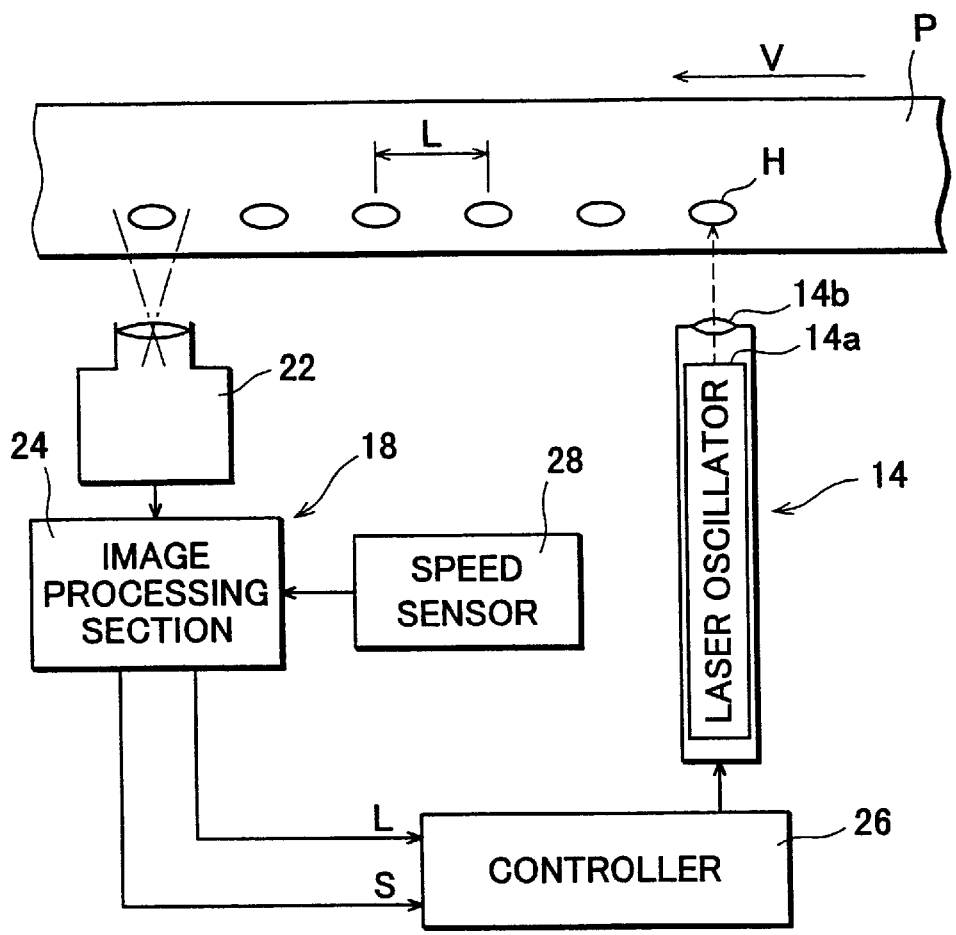
FIG. 2 is a schematic view showing primary parts of the piercing apparatus shown in FIG. 1, together with a tip paper which travels along a traveling path.
Figure 7:
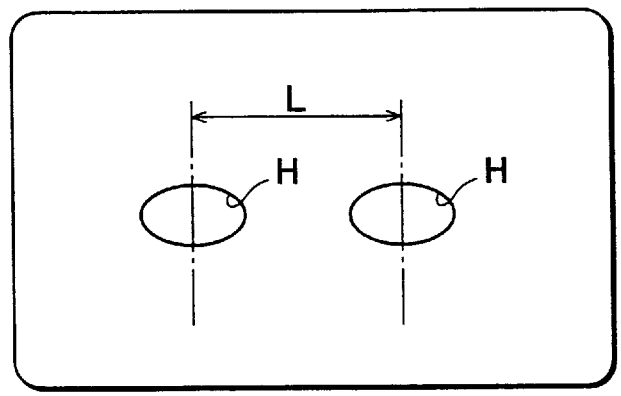
FIG. 7 is a view showing another example of an image of minute holes.

The piercing section 4 is provided with a laser piercing head 14 serving as a laser unit and located above the traveling path of the tip paper P. As shown in FIG. 2, the laser piercing head 14 is disposed to face an upstream-side portion of the tip paper traveling path and operates to intermittently irradiate a laser beam, e.g., by irradiating a pulsed laser beam, onto the tip paper P which travels at a predetermined speed V along the traveling path, thereby forming minute holes in the tip paper P. In this embodiment, the laser piercing head 14 is comprised of a carbon dioxide gas laser oscillator 14a of a pulse-driven type for generating a pulsed laser beam, and an optical system which includes a condensing lens 14b for focusing and irradiating the pulsed laser beam onto the tip paper P. The laser piercing head 14 is supported by a linear actuator 16, so as to be movable in the width direction of the tip paper P on the traveling path, thereby variably setting the position to which the pulsed laser beam is irradiated.

Further, an inspection unit 18 serving as an information unit is provided between the piercing section 4 and the winding section 6. The inspection unit 18 serves to optically inspect minute holes which are formed in the tip paper P by a laser beam irradiated thereto, thereby detecting pieces of information to be utilized for a control of the drive of or the laser beam irradiating action of the laser piercing head 14, such as the size (area S and/or length (in this embodiment, area S)) of and the pitch or spacing L between the minute holes. As shown in FIG. 2, the inspection unit 18 is disposed to face a downstream-side portion of the tip paper traveling path at a location downstream of the laser piercing head 14, and is comprised of a camera 22 for picking up an image of, e.g., the surface of the tip paper P, and an image processing section 24 for measuring, based on the image, the area S of and the spacing L between the minute holes H.

The piercing apparatus further includes a controller 26 which serves as a control unit and which is designed to provide the laser piercing head 14 with drive pulses at intervals of cycle T varying in dependence on the travel speed V of the tip paper P detected by a traveling speed sensor 28, and which unit controls the supply of drive pulses to the laser piercing head 14 in accordance with results of analysis performed by the image processing section 24 on the minute holes H.

More specifically, the controller 26 feedback-controls the pulse-driven cycle T of the laser oscillator 14a of the laser piercing head 14 in accordance with a deviation between a target spacing set in advance in the controller and the result (actual spacing) of the inspection performed by the inspection unit 18 on the spacing L of minute holes H, thereby making the spacing L of the minute holes H constant. Further, in accordance with a deviation between a target area set in advance in the controller 26 and the result (actual area) of the inspection effected by the inspection unit 18 on the area S of the minute holes H, the controller 26 feedback-controls the pulse width PM and/or the output intensity of a pulsed laser beam, thereby making the size of the minute holes H constant.

In the following, the optical detection of minute holes H and image analysis performed by the inspection unit 18 will be further explained.

Figure 3:
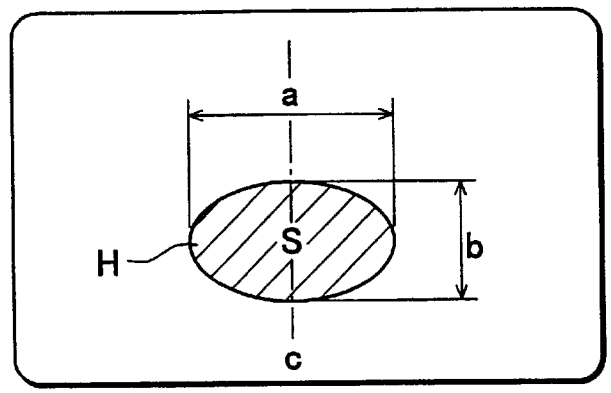
FIG. 3 is a view showing, by way of example, an image of a minute hole formed in a tip paper and optically detected by a camera shown in FIG. 2.

The camera 22 for optically detecting minute holes H formed in a tip paper P is comprised of, e.g., a CCD camera for picking up picture images of minute regions of the tip paper P at predetermined timing at a high speed, to thereby obtain a still picture image of each minute region of the tip paper. The timing at which a picture image is picked up by the camera 22 is set in synchronism with the timing at which the laser piercing head 14 is pulse-driven and which varies depending on the traveling speed V of the tip paper P. In FIG. 3, an example of a picture image of minute hole H taken by the camera 22 is shown.

By analyzing such a picture image, the image processing section 24 measures the area S of and the spacing L between minute holes H formed in a single row in a tip paper P.

In the measurement of the spacing L, the image processing section 24 extracts information on a predetermined part, such as the center position c, of a minute hole image from the picture image obtained at the image picking-up timing. Since the tip paper P travels at a constant speed V and the timing for picking up a minute hole image is synchronism with the timing at which a pulsed laser beam is irradiated for the formation of minute hole, the center positions c of minute hole images in picture images obtained at respective image picking-up timings are basically the same from one another. Thus, in accordance with a deviation of the center position c of a minute hole image obtained at each image picking-up timing, the image processing section 24 detects the spacing L of minute holes H.

Alternatively, if the camera 22 can pick up a picture image which includes a plurality of minute hole images, the center distance between adjacent ones of these minute hole images is directly measured from the minute hole images, to thereby determine the spacing L of the minute holes.

In the measurement of the area S of a minute hole H (which is generally ellipse in shape), the image processing section 24 measures the major-axis and minor-axis lengths of the image of the minute hole H in the picture image, and determines the area S, i.e., aperture area, of the minute hole H in accordance with the measured lengths. Alternatively, it is possible to determine the area S of the minute hole H by measuring the number of unit picture images contained in the image of the minute hole H. In either case, an image analysis process is executed at a high speed in real time with use of, e.g., a processor designed solely for the image processing.

Figure 4:
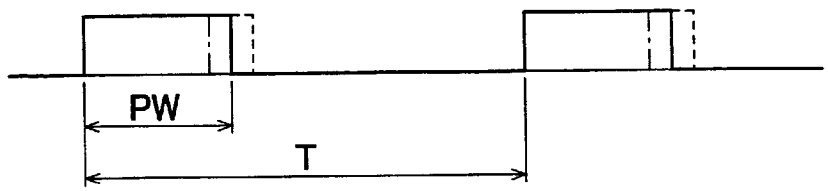
FIG. 4 is a diagram showing the timing at which drive pulses are applied to a laser oscillation head shown in FIG. 2.
Figure 5:
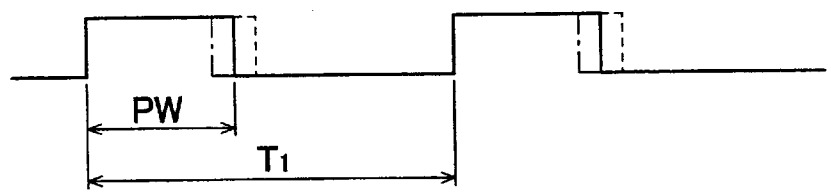
FIG. 5 is a view, similar to FIG. 4, showing a case where the drive pulse application timing is advanced.
Figure 6:
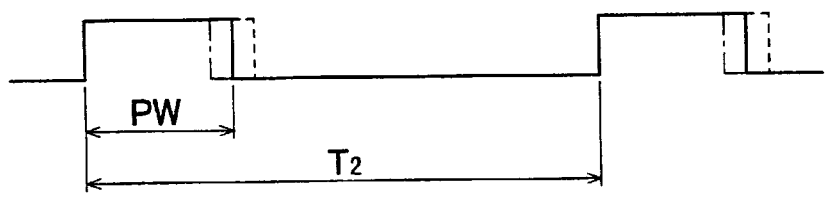
FIG. 6 is a view, similar to FIG. 4, showing a case where the drive pulse application timing is delayed.

In accordance with the results of the image analysis, the controller 26 adjusts the width PW of the drive pulse for the laser oscillator 14a of the laser piercing head 14, as shown by dotted lines in FIGS. 4–6, so that the area S of the minute hole H becomes a prescribed value S0 (not shown in the drawings), thereby changing the output of the laser oscillator 14a. More specifically, if the area S of the minute hole H is larger than the target value S0, the pulse width PW is caused to be narrow, thereby lowering the laser oscillation output, so that a time period for which the pulsed laser beam is used for the formation of a minute hole H is shortened, whereby the area S of a minute hole to be subsequently formed becomes smaller. Conversely, if the area S of the minute hole is smaller than the target value S0, the pulse width PW is expanded to increase the laser oscillation output so as to lengthen the time period for the formation of a subsequent minute hole by means of the pulsed laser beam, to thereby broaden the area S of subsequent minute holes. That is, in accordance with a deviation between the target area S0 and the area S of the minute hole which is determined by the image processing in real time, the time period for which the laser oscillator 14a of the laser piercing head 14 is pulse-driven is feedback-controlled so as to make the area S of the minute holes constant.

At the same time, in accordance with the spacing L between minute holes determined as explained above, the cycle T at which drive pulses are supplied to the laser oscillator 14a of the laser piercing head 14 is controlled by the controller 26 in a feedback manner. More specifically, if the spacing L is longer than a prescribed value L0 (not shown), the cycle T at which the laser oscillator is pulse-driven is shortened as shown at T1 in FIG. 5, thereby shortening the interval at which the minute holes are formed, so that the spacing L between the minute holes decreases. Conversely, if the spacing L is shorter than the prescribed value L0, the drive-pulse supplying period T is lengthened as shown at T2 in FIG. 6 to increase the period for the minute hole formation is made so that the spacing L is widened.

According to the piercing apparatus of this embodiment where the laser oscillator 14a of the laser piercing head 14 is pulse-driven under feedback control effected in accordance with the results of the image analysis on minute hole H, as described above, minute holes each having a required size (area S) which varies depending on requirements on the air permeability of the tip paper concerned can be formed in a stable manner with a required spacing L which also varies depending on the air permeability requirement, without the need of actually measuring the air permeability of the tip paper P formed with the minute holes H. In addition, the formation of minute holes which fully satisfy the requirements on air permeability can be controlled in real time. Thus, the efficiency of minute hole formation is highly improved, whereby the productivity of tip paper with minute holes is greatly improved. Moreover, the piercing apparatus is easily adapted to any change in the requirements on minute holes caused by a changeover in brand of filter cigarette.

The present invention is not limited to the foregoing embodiment, and can be modified variously.

For example, the piercing apparatus of the above-mentioned embodiment can be modified such that the pulse-driven laser piercing head 14 is controlled in accordance with the tip paper traveling speed alone. In this case, minute holes of a required size can be stably formed at a required spacing even if the tip paper traveling speed varies.

In order to measure the size of and the spacing between minute holes, an optical line sensor or optical area sensor may be employed instead of a camera 22.

Although a piercing apparatus of a single bobbin type forming minute holes in a single row has been explained in the foregoing embodiment, the present invention is also applicable to a piercing apparatus of a type forming minute holes in two or more rows in a single tip paper or a type forming minute holes in one or more rows in each of two or more tip papers which are arranged to simultaneously travel between a feeding section and a winding section of the piercing apparatus. In either case, it is enough to provide a piercing section of the apparatus with two or more laser piercing heads which correspond in number to the total number of the rows of minute holes. With regard to other respects, the present invention may be also variously modified without departing from the spirit of this invention.

What is claimed is:

1. A piercing apparatus for a web material, comprising:
   a traveling unit for causing the web material to travel along a traveling path defined in said piercing apparatus;
   a laser unit, disposed to face the traveling path, for intermittently irradiating a laser beam onto the web material which travels along the traveling path, to thereby form minute holes in the web material;
   a detection unit including an optical detector which is disposed to face the traveling path at a location downstream of said laser unit, which optically detects at least one of the minute holes formed in the web material which travels at a predetermined speed along the traveling path the detection unit detecting in real time a value of at least one parameter relating to formation of the minute holes;
   a control unit for controlling a laser beam irradiating action of said laser unit based on the detected parameter value; and
   an information unit for analyzing an image of the at least one minute hole detected by said optical detector and for generating information indicative of a result of analysis, wherein said information unit analyzes at least one image in respect of at least two minute holes detected by said optical detector, and generates spacing information indicative of a spacing with which the at least two minute holes are spaced; wherein
   said laser unit is configured to be pulse-driven and to generate a pulsed laser beam; and
   said control unit adjusts, based on the spacing information, a time interval at which said laser unit is pulse-driven.

2. The piercing apparatus according to claim 1, wherein said detection unit includes a traveling speed detector for detecting a traveling speed of the web material.

3. The piercing apparatus according to claim 1, wherein said information unit generates size information indicative of a size of the at least one minute hole detected by said optical detector;
   said laser unit is configured to be pulse-driven and to output a pulsed laser beam; and
   said control unit adjusts at least one of a pulse width and intensity of the pulsed laser beam in accordance with the size information.

4. The piercing apparatus according to claim 3, wherein the size information includes a major-axis and a minor-axis of the at least one minute hole.

5. The piercing apparatus according to claim 1, wherein the web material is a tip paper used to connect a cigarette with a filter plug.

6. The piercing apparatus according to claim 1, wherein the optical detector includes a camera, the detection of the at least one minute hole being performed by the camera and further being synchronized with the operation of the laser unit.

7. A piercing apparatus for a web material, comprising:
   a traveling unit for causing the web material to travel along a traveling path defined in said piercing apparatus;
   a laser unit, disposed to face the traveling path, for intermittently irradiating a laser beam onto the web material which travels along the traveling path, to thereby form minute holes in the web material;
   a detection unit including an optical detector which is disposed to face the traveling path at a location downstream of said laser unit, which detects an image of at least one of the minute holes formed in the web;
   a control unit for controlling a laser beam irradiating action of said laser; and
   an information unit for analyzing the image of the at least one minute hole detected by said optical detector and for generating information indicative of a result of analysis wherein said information unit analyzes at least one image in respect of at least two minute holes detected by said optical detector, and generates spacing information indicative of a spacing with which the at least two minute holes are spaced; wherein
   said laser unit is configured to be pulse-driven and to generate a pulsed laser beam; and said control unit adjusts, based on the spacing information, a time interval at which said laser unit is pulse-driven.

* * * * *